(12) United States Patent
Beevor et al.

(10) Patent No.: US 7,633,518 B2
(45) Date of Patent: Dec. 15, 2009

(54) OBJECT DETECTION PORTAL WITH VIDEO DISPLAY OVERLAY

(75) Inventors: Simon Peter Beevor, Poway, CA (US); Alexander R. Perry, San Diego, CA (US); Gerard Andrew Hanley, San Diego, CA (US); Steve Wolff, San Diego, CA (US); Peter V. Czipott, San Diego, CA (US)

(73) Assignee: Quantum Magnetics, Inc., San Diego, CA (US)

( * ) Notice: Subject to any disclaimer, the term of this patent is extended or adjusted under 35 U.S.C. 154(b) by 249 days.

(21) Appl. No.: 10/280,689

(22) Filed: Oct. 25, 2002

(65) Prior Publication Data

US 2004/0080315 A1 Apr. 29, 2004

(51) Int. Cl.
*H04N 7/18* (2006.01)

(52) U.S. Cl. ........................ 348/143; 348/156

(58) Field of Classification Search ......... 348/142–175; 382/100–102; 340/540–568.1
See application file for complete search history.

(56) References Cited

U.S. PATENT DOCUMENTS

| | | | |
|---|---|---|---|
| 3,971,983 A | 7/1976 | Jaquet | |
| 4,427,943 A | 1/1984 | Cloutier et al. | |
| 4,821,118 A * | 4/1989 | Lafreniere | 348/156 |
| 5,073,782 A * | 12/1991 | Huguenin et al. | 342/179 |
| 5,239,474 A | 8/1993 | Eaton, Jr. et al. | |
| 5,264,793 A | 11/1993 | Lo et al. | |
| 5,337,259 A | 8/1994 | Breed | |
| 5,387,863 A | 2/1995 | Lo et al. | |
| 5,455,590 A * | 10/1995 | Collins et al. | 342/179 |
| 5,521,583 A | 5/1996 | Frahm et al. | |
| 5,524,086 A | 6/1996 | Kiyuna et al. | |
| 5,680,103 A | 10/1997 | Turner et al. | |
| 5,684,396 A | 11/1997 | Aks et al. | |
| 5,694,867 A * | 12/1997 | Diaz-Lopez | 109/6 |
| 5,731,996 A | 3/1998 | Gilbert | |
| 5,783,944 A | 7/1998 | Rakijas | |
| 5,831,873 A | 11/1998 | Kohnen et al. | |
| 5,841,346 A * | 11/1998 | Park | 340/540 |
| 6,057,761 A * | 5/2000 | Yukl | 340/568.1 |
| 6,094,472 A * | 7/2000 | Smith | 378/86 |
| 6,150,810 A | 11/2000 | Roybal | |
| 6,342,835 B1 | 1/2002 | Nelson-White | |
| 6,430,987 B1 * | 8/2002 | Stark | 73/25.02 |
| 6,791,487 B1 * | 9/2004 | Singh et al. | 342/22 |

OTHER PUBLICATIONS

B. Zollars et al., Concealed Weapons Detection Using Low-Frequency Magnetic Imaging, *SPIE*, vol. 2935, pp. 108-119 (Aug. 1997).

* cited by examiner

*Primary Examiner*—Andy S Rao
(74) *Attorney, Agent, or Firm*—Armstrong Teasdale lLP (57) ABSTRACT

An object detection portal wherein a video image is obtained of a volume or area being scanned, and location of a threat object is determined and displayed in real time as an indicator overlay on the video image. An individual subject being scanned may be continuously monitored by an operator during an object divesting process, and an operator may view the threat object moving from or remaining with the subject. Object location information is supplied to a video driver to superimpose the overlay on a real time image of a subject. The scanning portal may interact with an exit barrier. The exit barrier may be activated automatically in response to sensing of a threat.

20 Claims, 12 Drawing Sheets

OBJECT DETECTION PORTAL WITH VIDEO DISPLAY OVERLAY

BACKGROUND

1. Field of the Invention

The present invention relates to object detection portals and more specifically to a system in which locations of detected objects are displayed as an indicator overlay on a video image of the volume being scanned.

2. Discussion of Related Art

A very common form of object detection portal is a metal detector archway such as a weapons detector portal used for security screening. Metal detection portals typically operate on the principles of inductive and/or magnetic detection of conductive or ferromagnetic objects such as guns or knives. Typically a person to be inspected walks through an archway structure containing an array of inductive coils and any resultant perturbation of the inductive coil fields is determined. Normally this perturbation is quantified by portal electronics to produce a signal whose magnitude is compared to a preset threshold value. If the signal is equal to or greater than the threshold value the portal will make an indication to the operator that the individual inspected may be carrying a weapon. The presence of a potential threat is often indicated by an audio tone or may be indicated by another signal.

Such systems are notoriously imprecise in distinguishing between benign objects and dangerous objects. False alarm rates typically range from 10% to 40%. The result of a false indication is that screening personnel need to conduct a secondary screening. A subject is required to divest further objects and be rescanned. The secondary screening may consist of further scans in the portal, scans with a hand-held metal detector, a manual "pat-down" or a combination of these methods. The time for the usual divesting prior to a scan and a single scan is typically 15 seconds. With false alarms, screening time for an individual can increase up to two minutes. The typical portal does not contain any means for restraining an individual who does not successfully complete the screening process.

One system which provides further information about the location of detected objects is disclosed in U.S. Pat. No. 6,150,810. In this prior art system, after determining the approximate horizontal and vertical locations of detected objects, as well as making some determination of the signal from each object, resulting data may be presented on a display. The display may include a computer-generated picture of a passageway and may also include a computer-generated silhouette or image of a person in the passageway. The display further includes indicator highlights of detected ferromagnetic objects. Alternatively, the display may include the highlights on a video "snap-shot" of the passageway. When secondary screening is conducted, a new scan must be performed. Object location data is not carried over from a first screening to a second screening. An operator having identified an object in a primary scan could mistakenly target a different area for a secondary scan.

It is highly desirable to provide a system in which further information is provided to a screener to improve the use and effectiveness of screening data indicating object location. It is also desirable to improve security by incorporating a condition-responsive restraint in a screening portal.

SUMMARY OF THE INVENTION

Briefly stated, embodiments of the present invention comprise an object detection portal in which a video image is obtained of the volume or area being scanned, and in which the location of a threat object is determined and displayed in real time as an indicator overlay on the video image. An individual subject being scanned may be continuously monitored by an operator during the divesting process, and an operator may view the threat object moving from or remaining with the subject. Object location information is supplied to a video driver to superimpose the overlay on a real time image of a subject. An operator may view a scanned object moving with a subject or with a limb of a subject or with an article carried or worn by a subject.

While the invention will readily find application with active and passive magnetic detection methods, it is not so limited. The video overlay may also be produced in response to sensing of non-metallic threat objects.

A real time video image of target location provides the following significant operational advantages over threat location systems which provide "after the fact" object location information. Significant human factors issues inherent in manual second level search procedures resulting from operator training, motivation, experience, fatigue, boredom or complacency are mitigated by providing real time object viewing. Importantly, the need for frequent "red-team" effectiveness testing to ensure the search effectiveness of operators carrying out the second level search is also reduced.

In a further form, the scanning portal may interact with an exit barrier in accordance with the invention. The exit barrier may be activated automatically in response to sensing of a threat. The addition of the automatically activated exit barrier further reduces human factors concerns as only passengers that are fully divested will be allowed to proceed; this decision is removed from the operator.

BRIEF DESCRIPTION OF THE DRAWING

The advantages and features of this invention will become readily apparent from the detailed description, when read in conjunction with the accompanying drawing, in which.

DETAILED DESCRIPTION OF THE PREFERRED EMBODIMENTS

Figure 1:
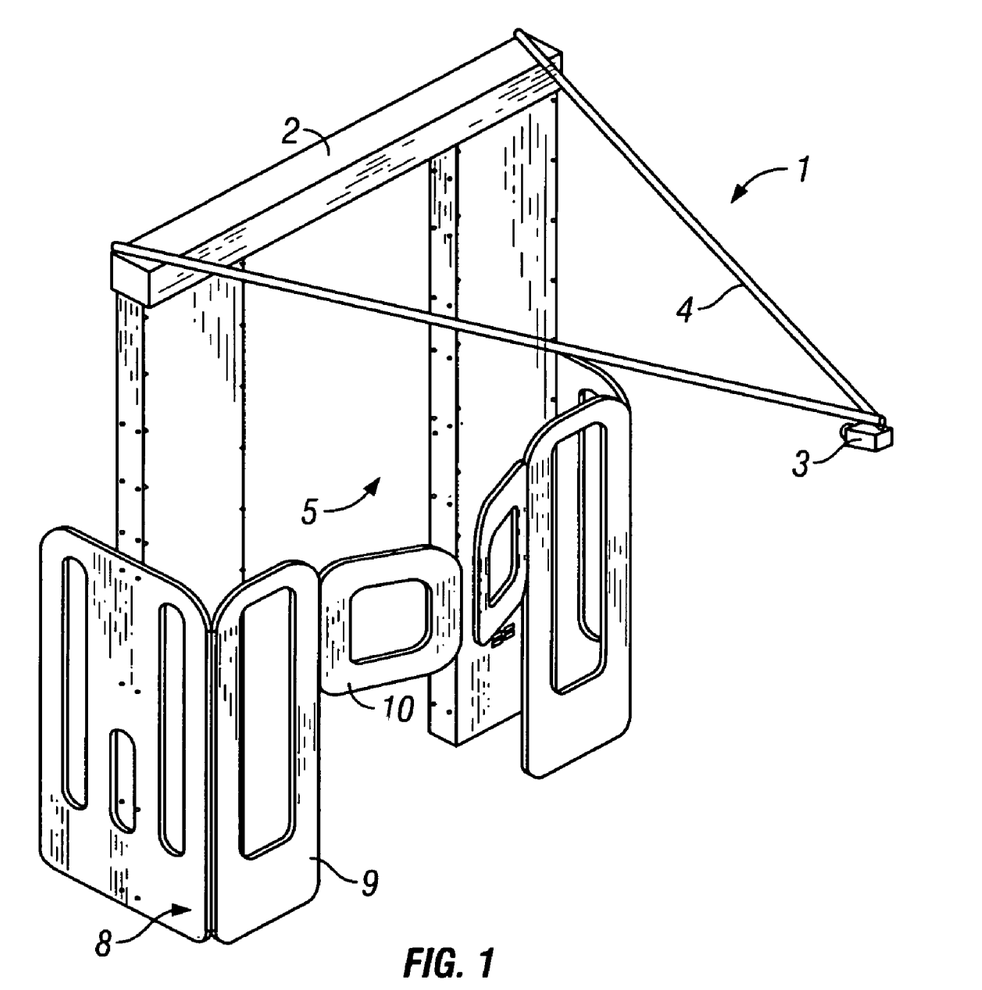
FIG. 1 is an axonometric view elevation of an object detection portal and exit barrier in an apparatus constructed in accordance with an embodiment of the present invention.

With reference now to the drawings, FIG. 1 is an axonometric view elevation of object detection portal 2 in apparatus 1 constructed in accordance with an embodiment of the present invention. Video camera 3 is mounted on support 4 in order to provide a display of scanned volume 5 in which a subject 14 (FIG. 2) to be scanned will be positioned. Subject 14 to be scanned will often be a person such as an airline passenger. Exit assembly 8 is preferably provided to impede the progress of a scan subject until the absence of a threat is confirmed. The exit assembly comprises barrier 9 closed by automatically operated gate 10. More than one video camera 3, each in a different position, may be used at a portal. This can assist in rapid resolution of threat objects.

Figure 2:
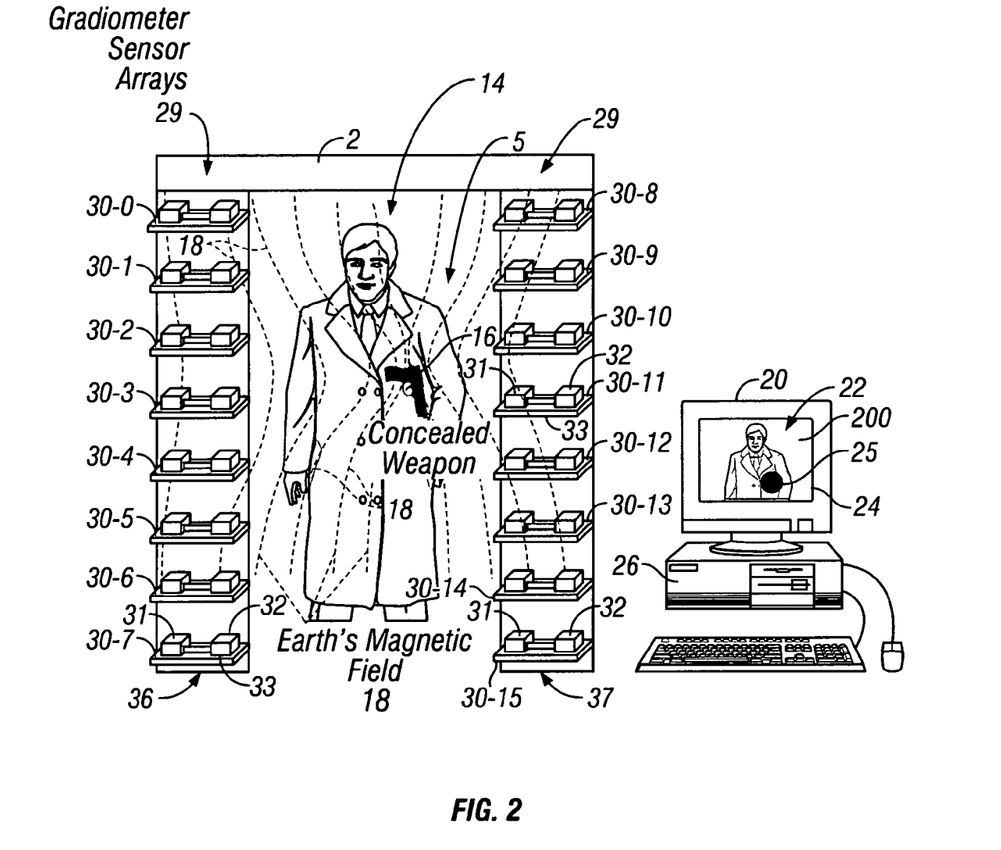
FIG. 2 is an elevation in schematic form of a portal, a scan subject and a video display and electronics unit in an apparatus constructed in accordance with an embodiment of the present invention.

FIG. 2 is an elevation in schematic form of portal 2 and scan subject 14 carrying a threat object 16. The threat object 16 will cause perturbation in the sensing of flux lines in the Earth's magnetic field as indicated by dotted lines 18. The term "threat object" is simply used to describe whatever type of object is to be sensed within portal 2. The term "threat" is used since a prevalent use of the present invention will be in security screening. However, the object to be detected need not be a dangerous or undesirable object. Video monitor 20 provides image 22. In accordance with embodiments of the present invention, overlay 24 is provided on image 22 in registration with the position of threat object 16. Electronics unit 26 processes signals from the portal and controls operation of apparatus 1. Portal 2 contains sensor array 29 comprising sensors 30 which are disposed around scan volume 5. The sensors may comprise active or passive magnetic sensors. Alternatively, to detect non-metallic objects, backscatter x-ray or passive millimeter wave technology may be used. Portal 2 may be incorporated in a stand-alone system or may be embedded in doorways, windows or other passageways. The portal may be overtly or covertly placed.

Different geometries may be employed for sensor array 29. As illustrated in FIG. 2, the sensors are disposed in a coplanar relationship and horizontally disposed. Alternatively, sensor array 29 could be non-planar or have sensor elements aligned to provide sensitivity in another degree of freedom in order to provide three-dimensional threat location information. In a further embodiment, sensors are arrayed and operated as a sensor gradiometer. By providing suitable algorithms for use in electronics unit 26, location of a threat object in three dimensions may be provided.

In the embodiment of FIG. 2, sensors 30 are exemplified by magnetic gradiometers. In one preferred form, each sensor comprises two magneto-resistive sensor chips 31 and 32 mounted on a printed circuit board 33. The reference numerals 31-33 are called out in the illustration of the sensor 30-11. In one embodiment, sensors 30 are mounted 12 inches apart. The vertical columns 36 and 37 are on opposite sides of scan volume 5. Groups of sensors 30 are included in each of vertical columns 36 and 37. Sensors 30-0 through 30-7 are vertically spaced through the height of column 36 and sensors 30-8 through 30-15 are spaced along the height of column 37. While 16 sensors are illustrated, any practical number may be used. X-ray or other forms of scanning may be used to detect non-metallic objects.

Figure 3A:
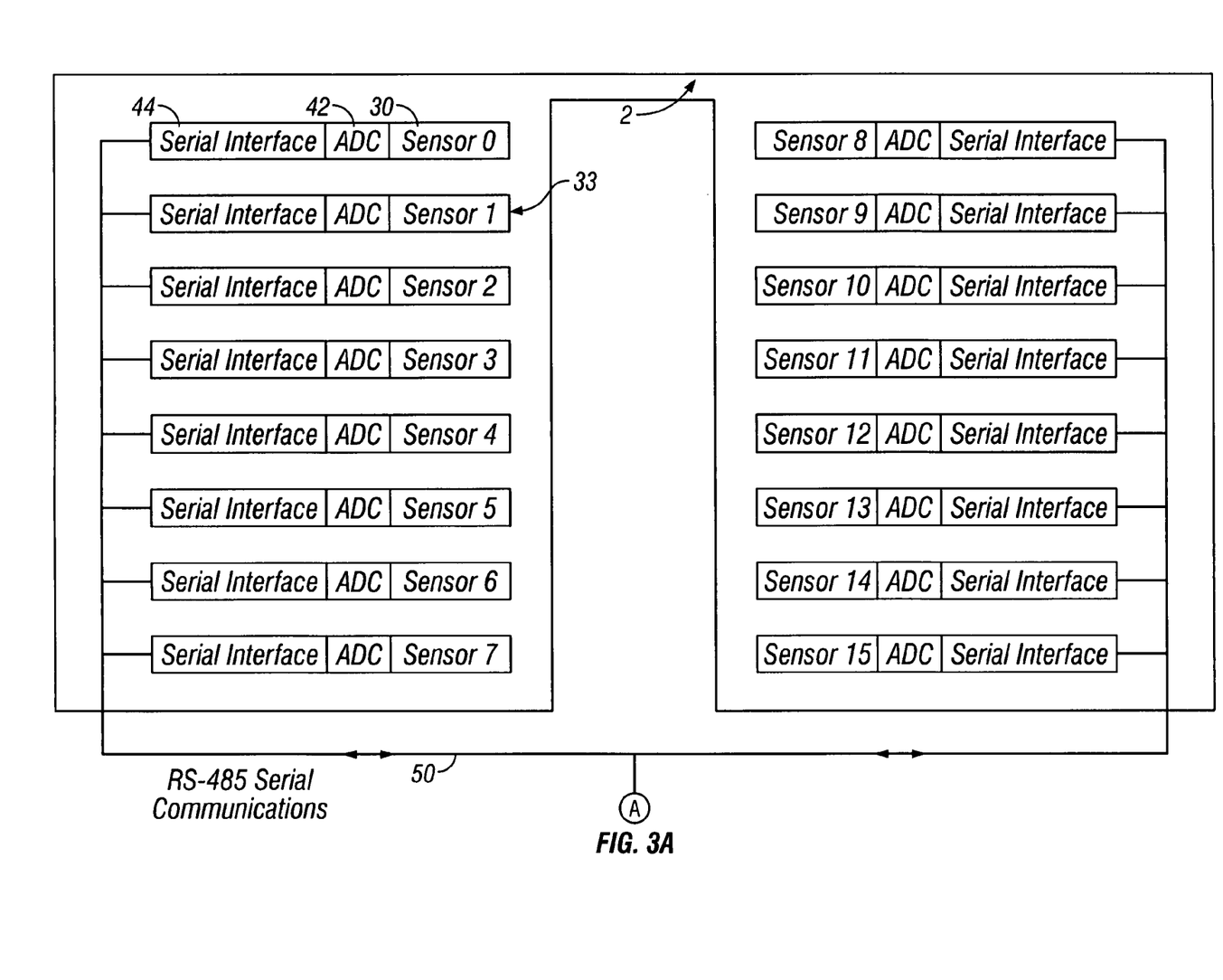
FIG. 3 is a block diagram of the electronic system of an embodiment of the present invention.
Figure 3B:
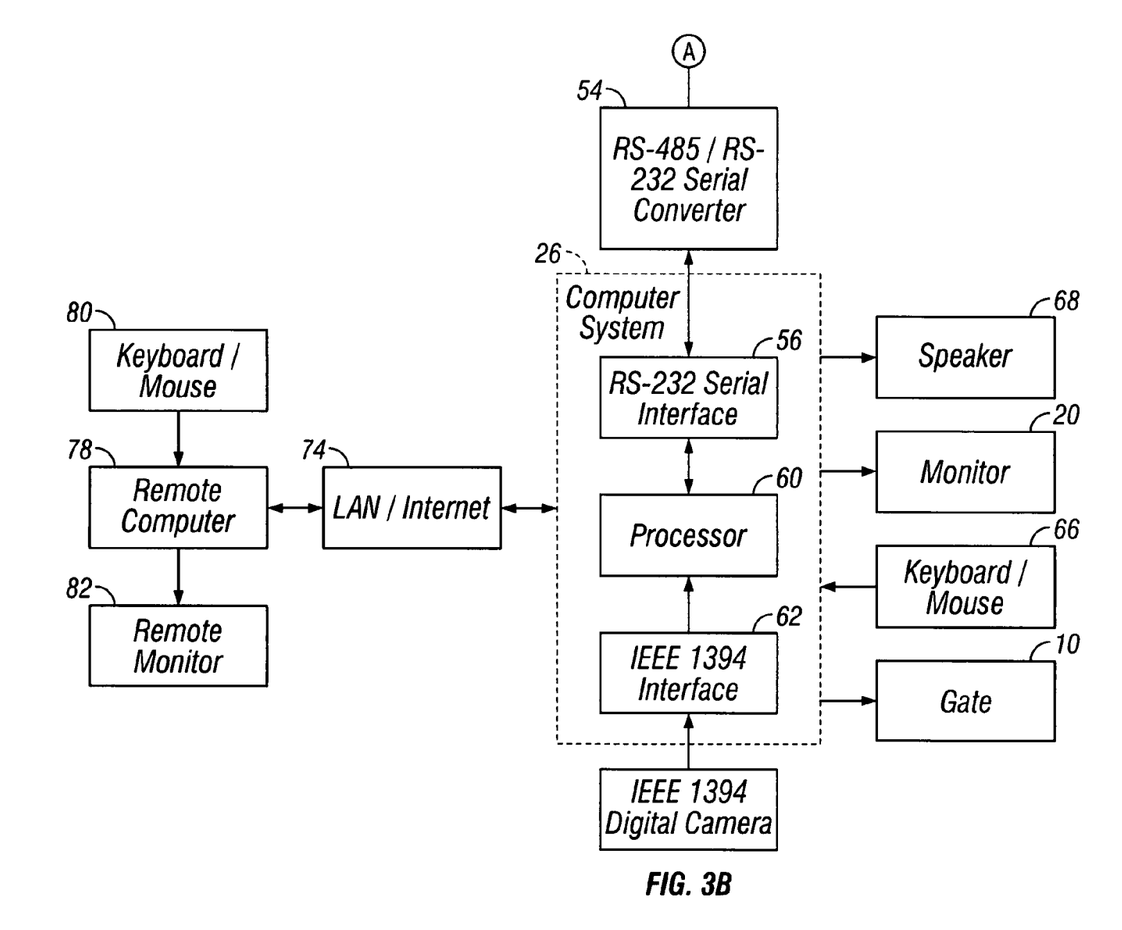

FIG. 3 is a block diagrammatic representation of the circuitry of the apparatus. Each sensor 30 provides an output to an analog-to-digital converter 42. A serial interface 44 couples each sensor output to a serial converter 54. The serial converter may be, for example, a well-known RS-485 to RS-232 serial converter. The preferred interface will be a function of network design. Serial converter 54 provides inputs to electronics unit 26. The electronics unit interacts with peripheral devices and may be included within a larger network. Electronics unit 26 comprises processor 60 which performs operations further described below. The electronics unit is coupled to interface circuit 54 by an internal interface 56, which could be, for example, an RS-232 serial interface. The electronics unit also includes video interface 62 coupled to video camera 3 (FIG. 1). The video interface may comprise an IEEE 1394 "Firewire" interface, which is suited as an interface for a digital video camera 3.

The electronics unit provides a video input to monitor 20. The electronics unit is also connected to control automatically operated gate 10. A user interface such as keyboard and mouse unit 66 may be provided for operator use. Speaker 68 may be connected to the electronics unit 26 to provide an actuatable audio alarm, if desired. Block 68 could as well be a visible alarm, or it could be both audible and visible alarm indicators. Electronics unit 26 may be coupled to remote communications link 74, which could comprise an Internet or local access network (LAN) connection. Link 74 communicates with remote computer 78 which may receive inputs from user interface 80 (keyboard or mouse, for example) and supplies an input to remote monitor 82. The remote monitor could be used for supervisor oversight of a screener located at portal 2. Alternatively, a number of portals 2 may be monitored from a central security point.

In order to avoid unwanted signals from magnetic fields generated by external AC power lines, it is important that data is acquired by each sensor 30 in an over-sampling mode relative to the AC mains power supply frequency, that is, 60 Hz in the United States. In other words, the sampling frequency should be high compared to 60 Hz. A preferable minimum sampling rate is at least 1 kHz with the result averaged preferably every 30-40 ms. This period represents a time equal to or faster than the desired video refresh rate for the image 22. In one preferred embodiment, sensors 30 sample at 32 kHz, and this data is decimated to 20.833 Hz.

Figure 4:
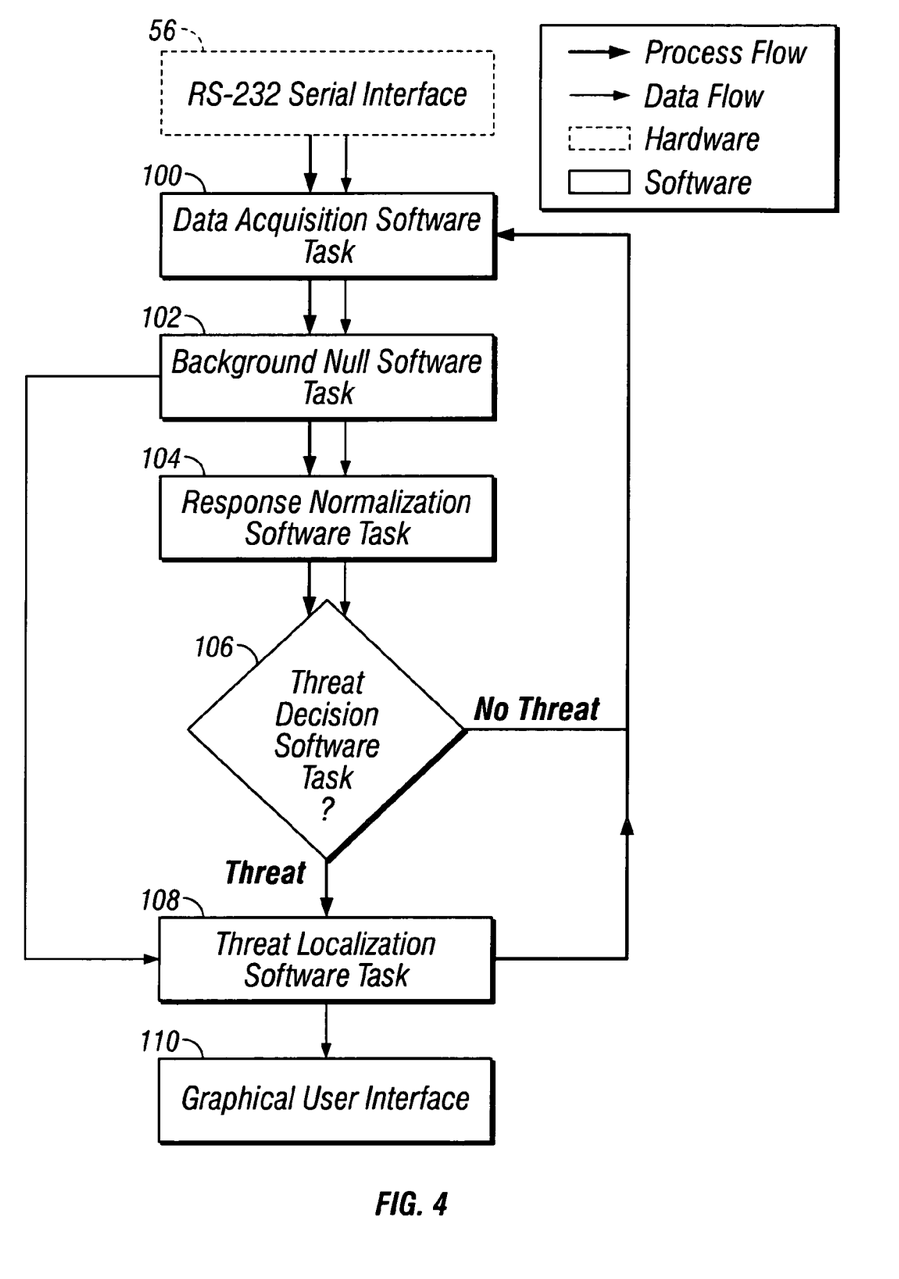
FIG. 4 is a flow diagram illustrating operation of the present invention.

On power-up, each sensor 30 operates autonomously to self-cancel steady state perturbations in magnetic field lines 18 (FIG. 2) due to the presence of nearby static metal objects. A slow time constant filter, for example, on the order of minutes, nulls the signal due to large static ferromagnetic objects outside of portal 2. After sensors 30 settle to zero output on initial start-up, the filter is disabled to prevent signal degradation and target ghosting during operation. Further operation is described with respect to FIG. 4, which is a flow diagram. Inputs are delivered to electronics unit 26 via serial interface 56. The data acquisition task is performed at block 100. A brief overview of FIG. 4 is taken prior to a discussion of FIG. 4 with respect to subsequent figures. Data from the serial interface 56 is acquired at block 100. At block 102, a background null task is performed so that signals can be resolved. Since the signal produced for a given threat object 16 will vary with its position within the portal 2, at block 104, a normalization is performed. The magnitude of the signal is compared at block 106 to a threat threshold, and a decision is made if a threat object 16 is present. If so, at block 108, threat localization software calculates the position of the threat object 16 in the portal 2. The output of the threat localization software task at block 108 is supplied to a graphical user interface 110 to produce the overlay 24 of FIG. 2.

Figure 5:
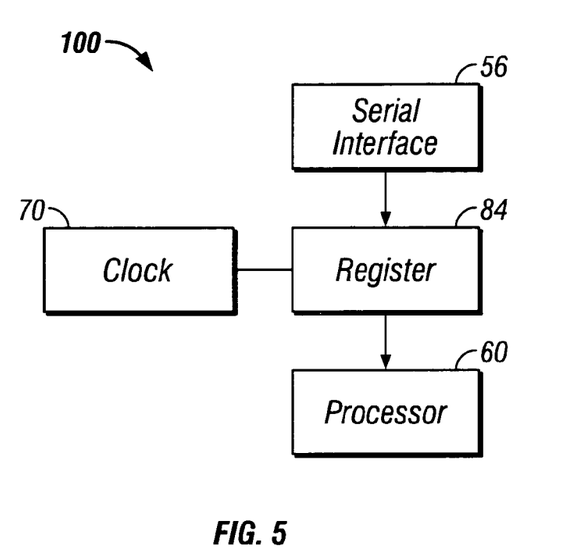
FIG. 5 is a diagram illustrating the data acquisition task of FIG. 4.

Block 100 is further illustrated with respect to FIG. 5 which is a block diagram of components within electronics unit 26. Data is provided from interface 56 to register 84. The data is time stamped by adding a further byte indicative of a time supplied from clock 70 to the digital data indicative of output of a sensor 30. The time-stamped signal from register 84 is supplied to processor 60. After acquiring a sensor 30 array data frame, the operation proceeds to block 102 of FIG. 4, which is nulling of background magnetic gradient signals in the absence of a threat object 16. Such background signals come from mobile clutter such as baggage trolleys or other large magnetic objects temporarily in the near vicinity of portal 2. Update of the sensor array data frame should occur at a rate of at least 20 Hz to ensure smooth target overlay representation on the video image.

Figure 6:
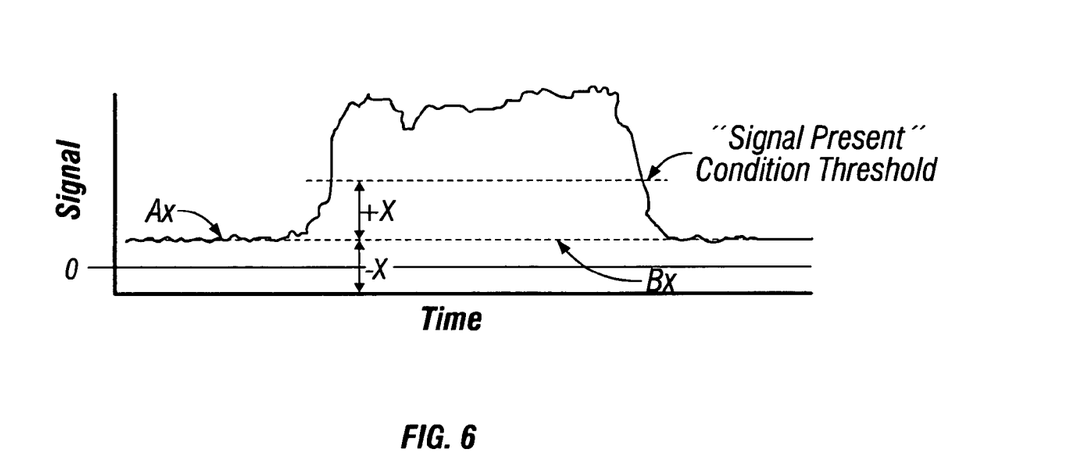
FIG. 6 is a waveform chart illustrating the background null task of FIG. 4.
Figure 7:
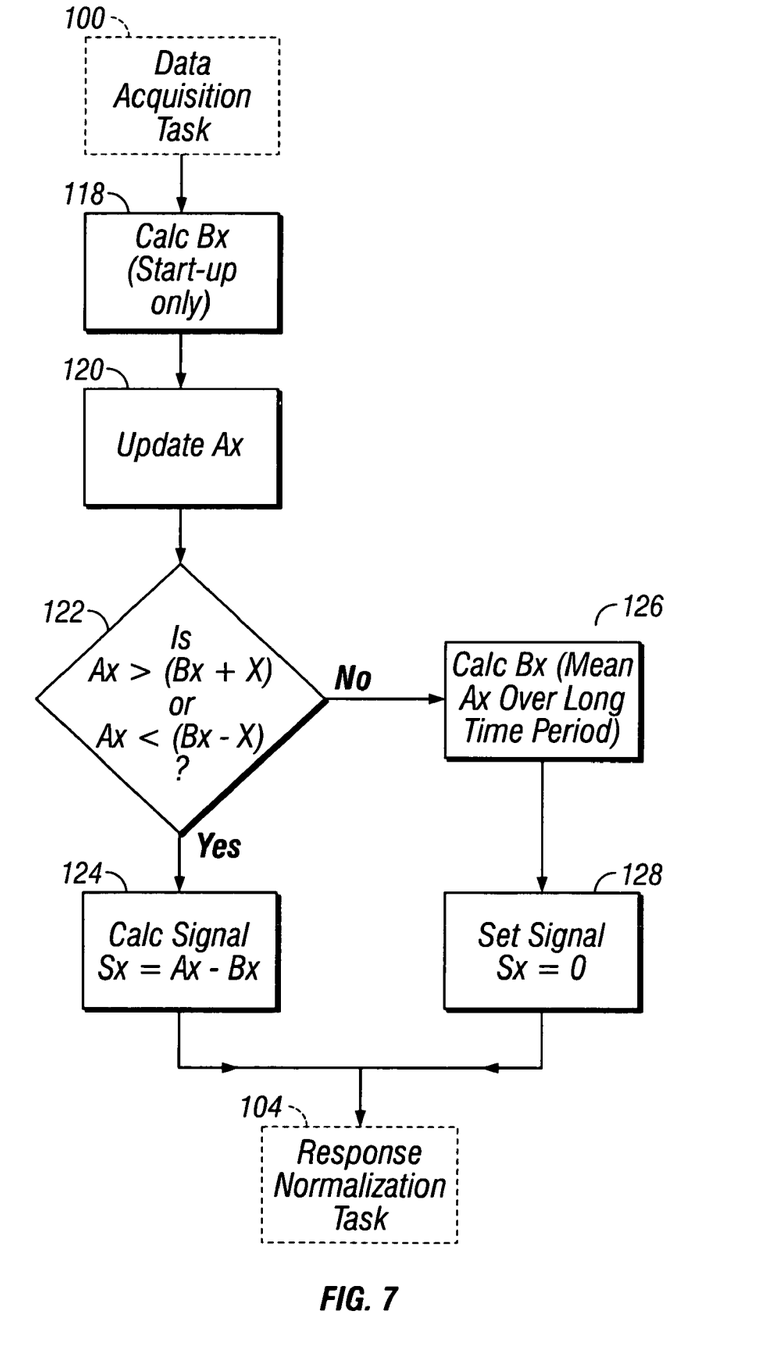
FIG. 7 is a flow diagram illustrating the background null task of FIG. 4.

Nulling of background signals is further illustrated with respect to FIGS. 6 and 7, which are, respectively, a waveform chart and a flow diagram. Each sensor 30 provides a signal $A_x$, as indicated at block 120 in FIG. 7, via 100, the data acquisition. $B_x$ is a background signal which equals the value of $A_x$ over an extended period, as indicated at block 126. At block 122, it is determined if $A_x$ exceeds $B_x$ by a threshold differential, ±X. If so, then a signal $S_x$ is determined to be present. If $A_x$ exceeds the threshold, at block 124, $S_x$ is calculated as $A_x - B_x$. If not, the output signal is set to $S_x=0$ at block 128. The background null process is repeated for each sensor 30-0 through 30-15. During system start-up, the $S_x$ output is disabled for a short period, for example, 30 seconds, while an initial value of $B_x$ is acquired at 121. The value of X is determined empirically and then preset in the system. Operation continues to block 104 in FIG. 4.

Figure 8:
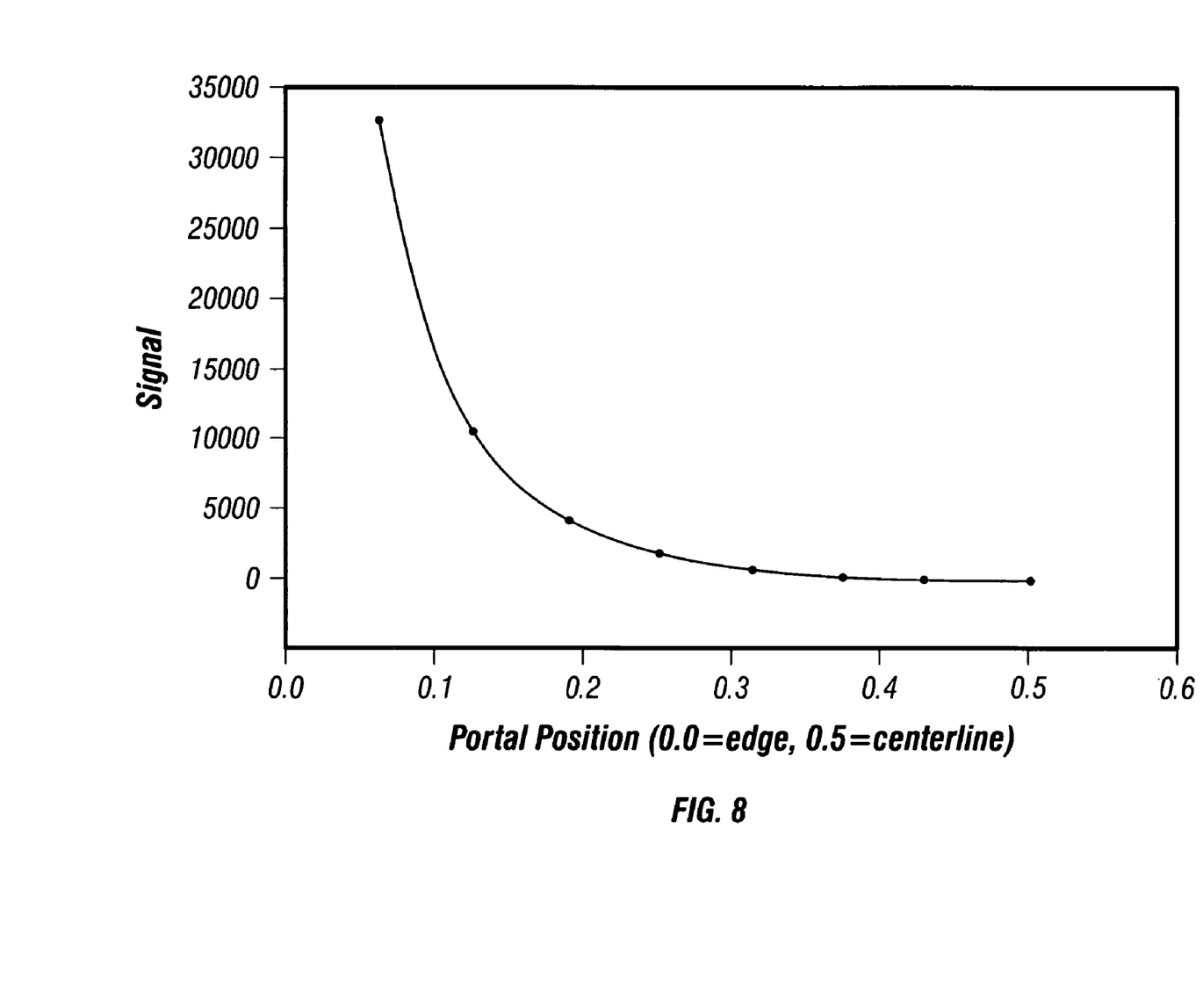
FIG. 8 is a waveform chart illustrating the response normalization task of FIG. 4.

At block 104, the output signal $S_x$ is normalized. This is illustrated with respect to FIG. 8, which is a plot of magnitude of $S_x$ for a given threat object 16 versus distance from a selected sensor 30. The curve of FIG. 8 is the result of two exponential terms representing near field and far field conditions. Relative signals $S_x$ from sensors in columns 36 and 37 on opposite sides of scan volume 5 are compared to estimate the horizontal position of threat object 16. Based on this comparison, signals $S_x$ from corresponding, oppositely disposed sensors are corrected to provide an output as though threat object 16 were on the centerline of portal 2.

The experimentally derived equations to do this are given below:

$$I^* = I(1-(b/(a+b))e^{-a(0.5-x)})(((a+b)/a)e^{-b(0.5-x)}) \quad (1-e^{-ax})(1-e^{-bx}) \qquad \text{(Eq. 1)}$$

$$x = 0.5 - m(\log_{10}(abs(L/R))) \qquad \text{(Eq. 2)}$$

where

I=raw signal intensity from a given sensor;

I*=scaled signal from sensor (predicted signal if target were at portal centerline);

x=distance from edge of portal (that is, 0.5=centerline of portal);

a=constant, near-field exponent (default=21.300);

b=constant, far-field exponent (default=9.663);

m=slope of the Log(L/R) signal versus portal position plot (default=0.146);

L/R=Raw signal 30-0/raw signal 30-8, raw signal 30-1/raw signal 30-9 . . . etc.

After a full sensor array data frame has been normalized, a threat decision analysis is performed at block 106 of FIG. 4. The absolute value of background nulled and normalized signals $S_x$ from each sensor 30 are independently compared to a preset alarm threshold. If there is no threat, the operation returns to block 100. If a threat is determined, programmed actions are taken. This will typically include providing a signal from electronics unit 26 to sound an alarm at speaker 68 (FIG. 3) and a signal to close automatically operated gate 10 (FIG. 1). The threshold level is typically operator configurable.

Figure 9:
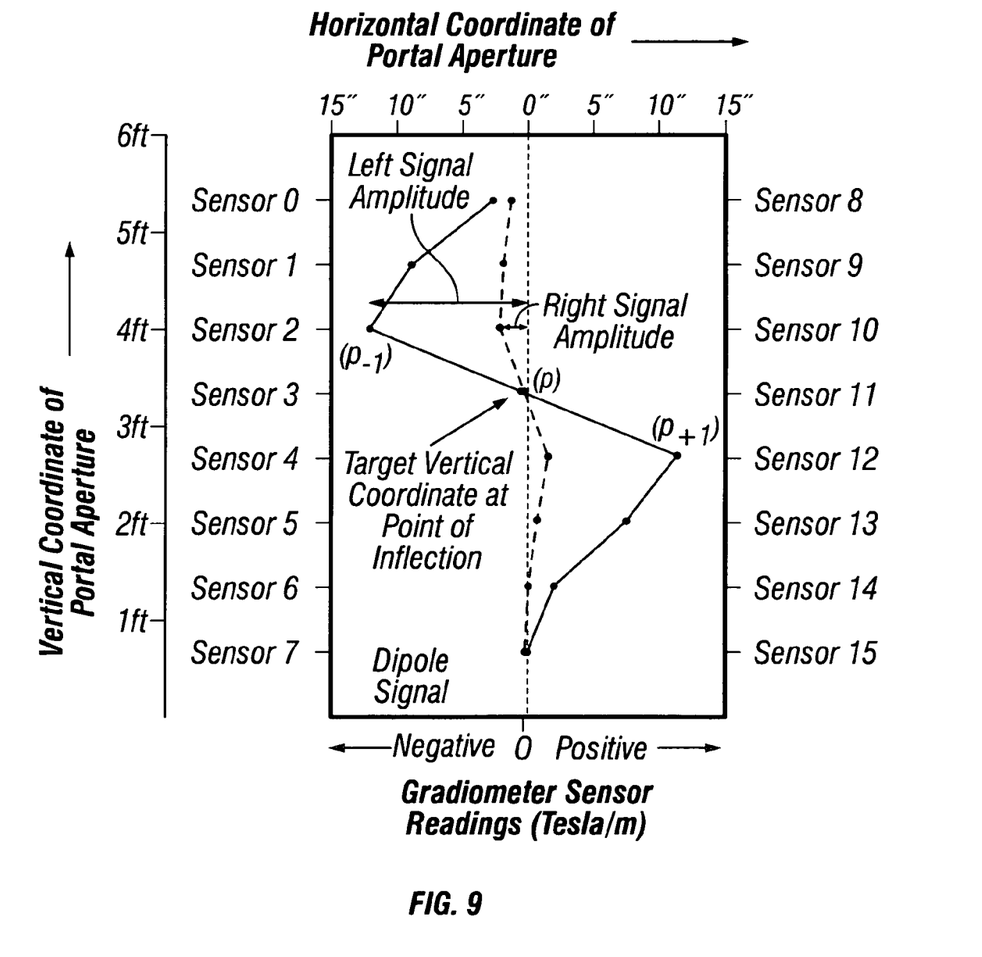
FIGS. 9, 10 and 11 are waveform charts illustrating the threat localization task of FIG. 4.
Figure 10:
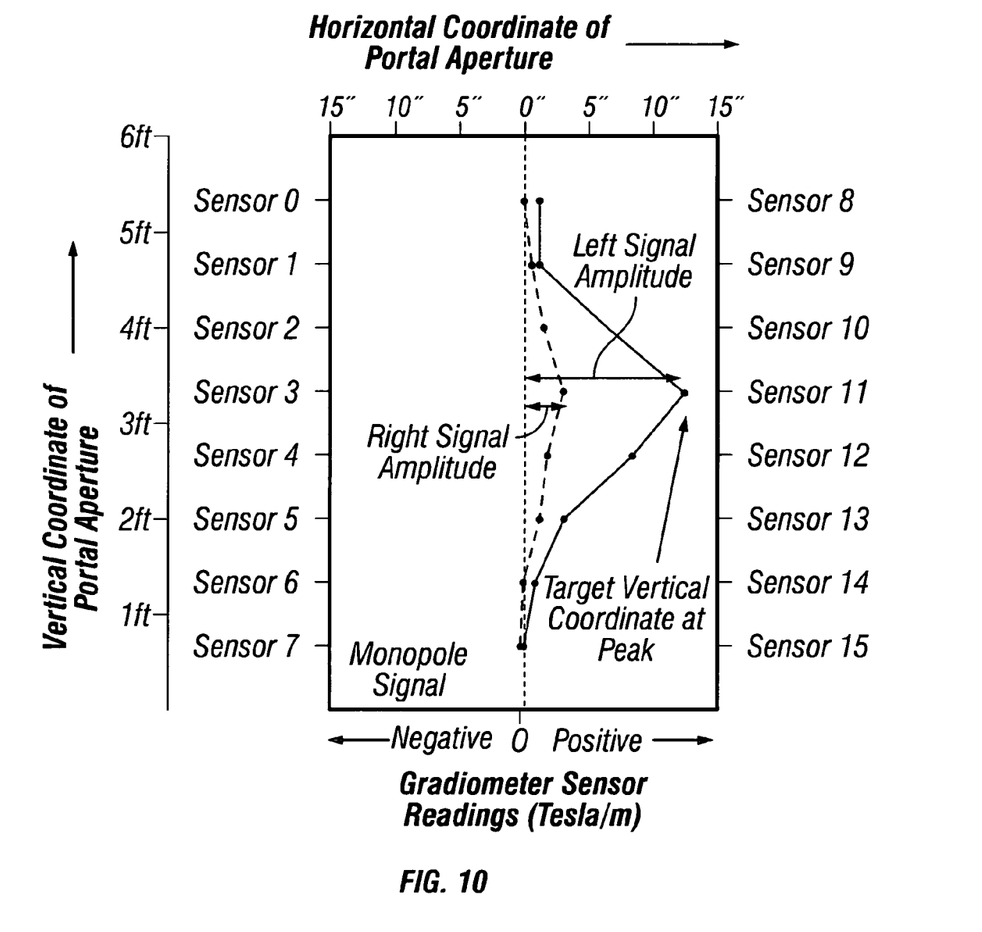
Figure 11:
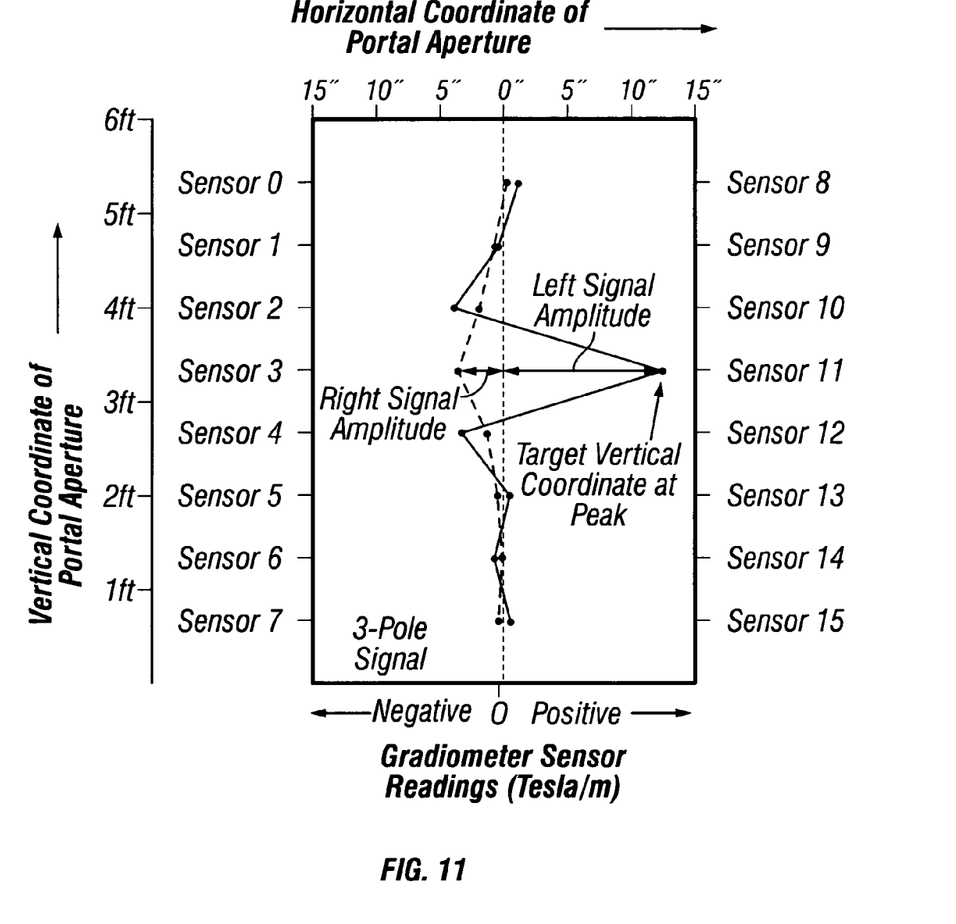

Determination of a threat also leads to the operation at block 108 in which a threat localization task is performed. This task is further described with respect to FIGS. 9, 10 and 11 which are each a waveform chart of sensor 30 readings plotted as sensor vertical position versus amplitude, in units of Tesla/m, for each sensor 30. The solid line plot is entitled Left Signal Amplitude, referring to the outputs of the sensors 30-0 through 30-7 in column 36. The dotted line plot is entitled Right Signal Amplitude, referring to the outputs of the sensors 30-8 through 30-15 in column 37. These plots define a "target signature" for a given threat object 16. Target signatures may be classified as monopole, dipole or three-pole. More complex signal structures may be further characterized as hybrid-monopole/dipole or other responses. FIG. 9 is illustrative of an object set comprising a dipole response. Both positive and negative peaks are measured. FIGS. 10 and 11 are illustrative of an object set comprising monopole and three-pole responses respectively. Object results for the Left Signals and Right Signals are treated independently.

Figure 12:
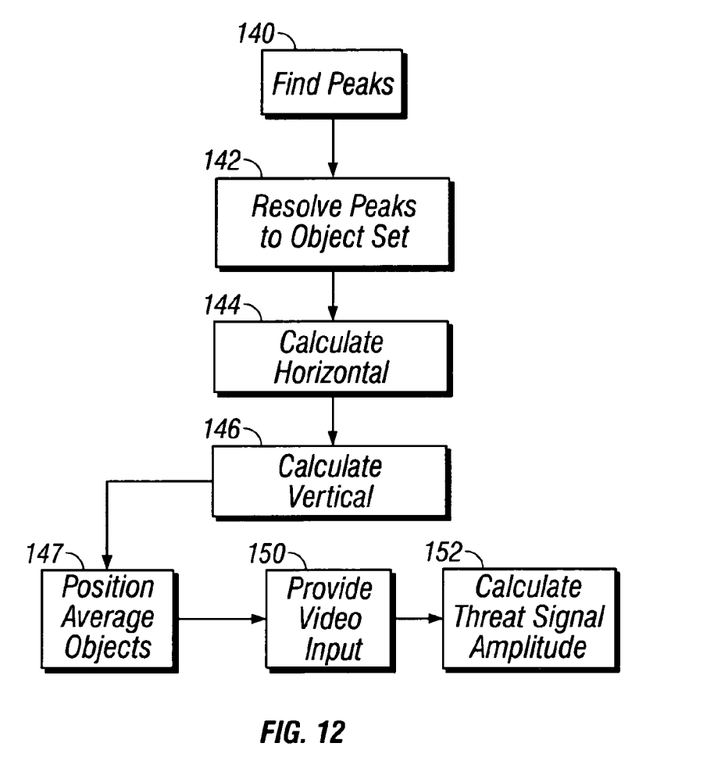
FIG. 12 is a flow chart illustrating the production of location and signal amplitude information for production of real time object location video data.

Referring to FIG. 12, which represents in more detail the threat localization software task 108, the target signature is first analyzed by determining all constituent peak signals 140. A peak signal is a signal $S_x$ from a sensor 30 having a greater amplitude than the signals $S_{x-1}$ and $S_{x+1}$ from sensors vertically adjacent. The peak signals will be utilized as described with respect to FIG. 12 below. The peak signal must also exceed a peak threshold setting. The peak threshold setting is a threshold which is always below the alarm threshold and that is required to ensure a small peak which is part of a target's signature but below alarm threshold is not neglected when locating signature peaks. The peak threshold will preferably be at a level that is slightly above sensor noise level.

At block 142, the peaks are reduced to an object set based on the magnetic signature. A monopole response is defined as a peak with no neighboring peaks within plus or minus 2 vertical sensors 30. A dipole response is defined as two peaks with opposite polarity separated by 1 or 2 vertical sensors 30. A three-pole response is defined as one peak with two neighboring peaks, one on each side of the primary peak, of opposite polarity within 1 or 2 vertical sensors 30. When a signature is ambiguous, the lower order object is selected. A set of calculations for determining location of a threat object 16 in two dimensions is as follows. For other embodiments that utilize three dimensional localization additional steps would be required.

Monopole or Three-Pole Responses

If the object has been classified as a monopole or a three-pole then the object location is calculated as follows using a signal amplitude weighting protocol vertically. For the weighting protocol $y_p$ is the vertical sensor coordinate of the monopole or three-pole peak and $I_p$ is the signal amplitude from that sensor.

Only sensor rows with signals of the same polarity as the primary peak are considered, hence signals from 1 to 3 vertical sensors 30 will be used, dependent on the signature width, that is, $I_p$ alone, $I_p$ and $I_{p+1}$, $I_p$ and $I_{p-1}$, or $I_{p-1}$ and $I_p$ and $I_{p+1}$.

For left side objects:

$$y_{left\ side} = (I_{p-1}/(I_{p-1}+I_p+I_{p+1}))y_{p-1} + (I_p/(I_{p-1}+I_p+I_{p+1}))y_p + (I_{p+1}/(I_{p-1}+I_p+I_{p+1}))y_{p+1} \qquad \text{(Eq. 3)}$$

$$x_{left\ side} = 0.5 - m(\log_{10}(abs(I_p/I_{p+8}))) \qquad \text{(Eq. 4)}$$

For right side objects:

$$y_{right\ side}=(I_{p-1}/(I_{p-1}+I_p+I_{p+1}))y_{p-1}+(I_p/(I_{p-1}+I_p+I_{p+1}))y_p+(I_{p+1}/(I_{p-1}+I_p+I_{p+1}))y_{p+1}$$ (Eq. 5)

$$x_{right\ side}=0.5+m(\log_{10}(abs(I_p/I_{p+8})))$$ (Eq. 6)

For monopole objects with peaks located at the top or bottom sensor row the same protocol is used with I=0 for "phantom" sensors above or below the physical sensor array.

Dipole Responses

For dipole responses the two constituent vertical peak locations from each sensor vertical column 36 and 37 are each independently averaged with a signal amplitude weighting function to determine left and right side threat locations, where $y_{p1}$ is the vertical coordinate of the top dipole peak and $y_{p2}$ the vertical coordinate of the bottom dipole peak:

For left side objects:

$$y_{left\ side}=(I_{p1}/(I_{p1}+I_{p2}))y_{p1}+(I_{p2}/(I_{p1}+I_{p2}))y_{p2}$$ (Eq. 7)

$$x_{left\ side\ 1}=0.5-m(\log_{10}(abs(I_{p1}/I_{p1+8})))$$ (Eq. 8)

$$x_{left\ side\ 2}=0.5-m(\log_{10}(abs(I_{p2}/I_{p2+8})))$$ (Eq. 9)

$$x_{left\ side}=(I_{p1}+I_{p1+8})/(I_{p1}+I_{p1+8}+I_{p2}+I_{p2+8})x_{left\ side\ 1}+(I_{p2}+I_{p2+8})/(I_{p1}+I_{p1+8}+I_{p2}+I_{p2+8})x_{left\ side\ 2}$$ (Eq. 10)

For right side objects:

$$y_{right\ side}=(I_{p1}/(I_{p1}+I_{p2}))y_{p1}+(I_{p2}/(I_{p1}+I_{p2}))y_{p2}$$ (Eq. 11)

$$x_{right\ side\ 1}=0.5+m(\log_{10}(abs(I_{p1}/I_{p1-8})))$$ (Eq. 12)

$$x_{right\ side\ 2}=0.5+m(\log_{10}(abs(I_{p2}/I_{p2-8})))$$ (Eq. 13)

$$x_{right\ side}=(I_{p1}+I_{p1+8})/(I_{p1}+I_{p1+8}+I_{p2}+I_{p2+8})x_{right\ side\ 1}+(I_{p2}+I_{p2+8})/(I_{p1}+I_{p1+8}+I_{p2}+I_{p2+8})x_{right\ side\ 2}$$ (Eq. 14)

Finally, any two objects with estimated vertical coordinates within a defined two dimensional spacing should be position averaged (x and y coordinates) 147 and plotted as a single object. The pre-defined spacing parameter "alarm reduction range" is experimentally optimized.

$$y_{final\ alarm}=(I_{right\ alarm}/(I_{right\ alarm}+I_{left\ alarm}))y_{right\ side}+(I_{left\ alarm}/(I_{right\ alarm}+I_{left\ alarm}))y_{left\ side}$$ (Eq. 15)

$$x_{final\ alarm}=(I_{right\ alarm}/(I_{right\ alarm}+I_{left\ alarm}))x_{right\ side}+(I_{left\ alarm}/(I_{right\ alarm}+I_{left\ alarm}))x_{left\ side}$$ (Eq. 16)

For three-pole and monopole responses the threat signal amplitude, $I_{alarm}=I_p$, for dipole responses the threat signal amplitude is the greater of $I_{p1}$ and $I_{p2}$. Where left side and right side alarms are position averaged, the signal amplitude is given by the greater of the left side or right side alarms.

Finally, threat location coordinates and signal amplitudes are transferred to the processor 60 (FIG. 3), where the threat coordinates are mapped to video image 22 (FIG. 2) of portal 2 and an overlay 24 applied to the image. Image 22 and the position of threat objects 16 are indicative of a state in scan area 5 at substantially the same time. In the simplest embodiment the video overlay 24 output may simply comprise a dot 25 on video image 22 with the color or diameter of each dot representing the signal amplitude from the corresponding threat object 16. Image 22 and overlay 24 are simultaneously updated. They are also continuously updated so that a threat object 16 moving in a fixed relation to part of a scan subject 14 will be seen to move concurrently therewith.

In a second embodiment the overlay format may be extended to represent the region of probability for location of the threat object 16 or a plurality of threat objects 16 by convolving the sensor array spatial resolution function with the target object(s) 16 estimated location and signal amplitude. The result can be displayed by overlaying a color or density coded translucent shading on the image of the person screened as shown in FIG. 2. In a third embodiment it may be found advantageous to average over time dot position and signal amplitude to reduce dot jitter due to small variations in signal resulting from system noise and to improve signal to noise ratio. Signals above alarm threshold may, for example, be position and amplitude averaged within a rolling window of, say, five video frames, and the result displayed. As a further enhancement various filters such as a truncated Gaussian time domain filter might be applied to the data to more optimally smooth dot motion and maximize signal to noise.

This process is summarized in FIG. 12, which is a flow chart. At block 140, all peaks in the sensor array data frame are found. At block 142, the peaks are resolved to an object set. Horizontal location is calculated at block 144, and vertical location information is calculated at block 146 for each object in the object set. The calculations of horizontal and vertical positions could alternatively be done in reverse order or simultaneously. At block 147 all objects within a set two dimensional distance are position averaged. At block 150, the final values obtained for horizontal and vertical position of each threat object are mapped to video signals to locate overlay 24 on display 22. Finally, at block 152, the signal amplitude of each threat object is calculated.

Figure 13:
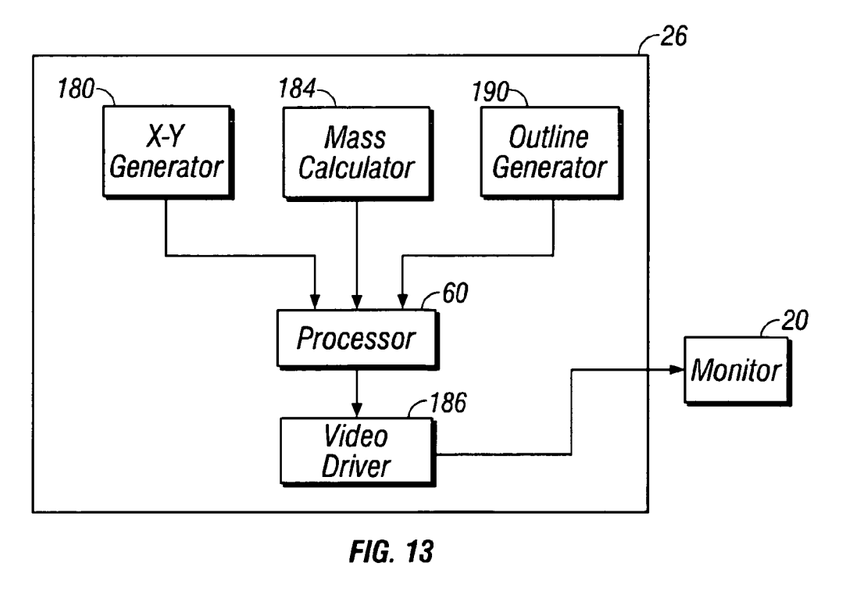
FIG. 13 is a block diagram of a video circuit in the electronics unit of FIGS. 2 and 3.

FIG. 13 is a block diagrammatic representation of a video circuit included in electronics unit 26 (FIG. 3). X-Y generator 180 receives the outputs of the process at blocks 150 of FIG. 12. The X-Y generator provides an input to processor 60, which supplies inputs to video driver 186. This will locate video overlay 24 on display 22. Additionally, mass calculator 184 receives the result of the mass calculation for threat object 16 from block 152. An outline generator 190 provides an input to processor 60, which supplies inputs to video driver 186 to determine the size, shape and color of overlay 24 on image 22 (FIG. 2), To ensure the camera/archway geometry is correctly configured in operational use, the video circuit of FIG. 13 includes outline generator 190 to provide an input to processor 60. Based on this input, the expected outline 200 (FIG. 2) of scan volume 5 in portal 2 is provided by video driver 186 to be shown on-screen as shown in FIG. 2. For geometry setup and adjustment a suitable input device, such as keyboard/mouse unit 66 (FIG. 3), can be interfaced to outline generator 190 to be used to select, drag, move and rotate the aperture indicator lines thereby defining the geometric relationship between the cameras field of view and the archway aperture. Once defined by the outline generator a given camera and portal geometry relationship can be provided to the video input block 150 to scale threat coordinates to video overlay coordinates appropriately. This allows any suitable camera location to be readily used with a simple software adjustment and also facilitates easy fine adjustment of relative geometry thus avoiding physically moving the archway or camera. Preferred input devices include an analog or digital mouse, a joystick, or a trackball, for example. Touch pads and keyboards may also be used.

The specification will enable those skilled in the art to make many departures from the specific teachings herein and provides embodiments of a method and apparatus in accordance with the present invention.

What is claimed is:

1. An object detection portal system comprising:
   an object detection portal configured to detect, real-time, the presence of a threat object in a scan volume;

a video camera to produce a real-time image of the scan volume and provide an output to a display of a scan subject;

a background signal filter to remove detected background signals caused by objects outside the scan volume;

a threat object position calculator to produce real-time signals indicative of a real-time position of the threat object, the real-time position of the threat object including at least a horizontal position of the threat object with respect to the object detection portal;

a shape generator to produce a real-time overlay indicative of the real-time position of the threat object in response to sensing of the threat object, wherein the real-time image and the overlay are indicative of a state in the scan volume at substantially one time; and a display driver to produce a signal that allows a real-time visual superimposition of the real-time position of the threat object overlay on the real-time image of the scan volume, wherein the real-time overlay indicative of the real-time position of the threat object is overlaid on the real-time image produced by the video camera using the real-time signals from the threat object position calculator to position the overlay on the real-time image.

2. The system of claim 1, wherein said video camera comprises a digital video camera.

3. The system of claim 1, wherein said object detection portal comprises an array of gradiometer sensors.

4. The system of claim 3, wherein said array is planar and comprises a plurality of sensors vertically displaced from each other on either side of the scan volume.

5. The system of claim 1, and further comprising a gate cooperating with said portal to prevent movement from said portal, said gate being automatically actuatable in response to detection of a threat object.

6. The system of claim 1, wherein the shape generator is configured to map the real-time signals to video signals generated by the imaging means.

7. A method for displaying real-time information derived from a scan volume, said method comprising:

receive, from a video camera, real-time image of the scan volume;

removing from the real-time image, detected background signals caused by objects outside the scan volume;

detecting a threat object and determining a position of the threat object in real-time in the scan volume, the real-time position of the threat object including at least a horizontal position of the threat object with respect to a detection portal, the real-time image and the real-time position of the threat object being indicative of a state in the scan volume at substantially one time; and producing an overlay indicative of the real-time position of the threat object, wherein said producing the overlay comprises overlaying the overlay on the real-time image produced by the video camera.

8. The method of claim 7, and further comprising simultaneously updating the real-time image and the overlay.

9. The method of claim 8, and further comprising operating an automatic gate cooperating with a portal surrounding the scan volume in response to sensing of a threat object.

10. The method of claim 8, and further comprising generating a display of portal boundaries on the real-time image.

11. An object detection portal system including sensors providing a set of inputs and a video camera for producing a real-time image of a scan volume and an indication of a threat object detected by said sensors, said object detection portal system comprising:

a sensor array configured to perform a scan with said sensors to provide successive sets of inputs from said sensors, the inputs generated at least a video refresh rate;

a background signal filter to remove detected background signals caused by objects outside the scan volume;

a threat object position calculator configured to use said successive sets of inputs to produce successive signals indicative of a real-time position of the threat object, each signal being produced in response to one set of inputs, the real-time position of the threat object including at least a horizontal position of the threat object with respect to said sensor array; and an electronics unit comprising a video processor that receives an output of said threat object position calculator and generates an overlay superimposed on the real-time image, wherein the overlay is superimposed on the real-time image produced by said video camera using the successive signals indicative of the real-time position of the threat object.

12. The system of claim 11, wherein said electronics unit comprises a shape generator defining a preselected shape for the overlay.

13. The system of claim 11, wherein said sensor array is configured to time-stamp the successive sets of inputs as the successive sets of inputs are acquired.

14. The system of claim 11, wherein said electronics unit comprises a signal amplitude calculator configured to calculate a signal from each threat object within the scan volume, and wherein said video processor is configured to determine at least one of a size and at least one characteristic of the overlay in accordance with the calculated signal amplitude of the threat object.

15. The system of claim 1 further comprising a magnetic sensor configured to sense a perturbation created by the scan volume in a plurality of magnetic field scan lines, and wherein the overlay represents the perturbation.

16. The system of claim 3 further comprising an output signal normalizer configured to correct differing signals from corresponding, oppositely disposed sensors of said array of gradient sensors.

17. The system of claim 3 further comprising a threat decision analyzer configured to compare signals from said array of gradient sensors to a preset alarm threshold.

18. The method of claim 7 further comprising normalizing differing signals from corresponding, oppositely disposed sensors.

19. The method of claim 7 further comprising comparing signals received from sensors to a preset alarm threshold.

20. The system of claim 11 further comprising an output signal normalizer configured to correct differing signals from corresponding, oppositely disposed sensors.

* * * * *

UNITED STATES PATENT AND TRADEMARK OFFICE
CERTIFICATE OF CORRECTION

PATENT NO. : 7,633,518 B2  Page 1 of 1
APPLICATION NO. : 10/280689
DATED : December 15, 2009
INVENTOR(S) : Beevor et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 517 days.

Signed and Sealed this

Twenty-first Day of December, 2010

David J. Kappos
*Director of the United States Patent and Trademark Office*